United States Patent [19]
Plana

[11] Patent Number: 6,113,122
[45] Date of Patent: *Sep. 5, 2000

[54] STABILIZER TRAINING WHEEL FOR BICYCLE

[75] Inventor: Salvio Plana, Drummondville, Canada

[73] Assignee: Brevets Futek-M. S. M. LTEE, Quebec, Canada

[ * ] Notice: This patent is subject to a terminal disclaimer.

[21] Appl. No.: 09/239,787

[22] Filed: Jan. 29, 1999

Related U.S. Application Data

[63] Continuation of application No. PCT/IB96/00761, Jul. 30, 1996, which is a continuation-in-part of application No. 08/427,179, Apr. 24, 1995, abandoned.

[51] Int. Cl.[7] ..................................................... B62H 1/12
[52] U.S. Cl. ........................... 280/293; 280/298; 280/304
[58] Field of Search ..................................... 280/293, 298, 280/295, 300, 301, 303, 304, 767, 701, 722; 267/289, 286

[56] References Cited

U.S. PATENT DOCUMENTS

| | | |
|---|---|---|
| 617,136 | 1/1899 | Wilkins . |
| 2,717,807 | 9/1955 | Kapp . |
| 2,723,133 | 11/1955 | Pawsat . |
| 2,828,141 | 3/1958 | Erstad et al. . |
| 2,976,057 | 3/1961 | Krokos et al. . |
| 5,492,354 | 2/1996 | Rainey .................................... 280/293 |
| 5,707,069 | 1/1998 | Plana ....................................... 280/292 |

FOREIGN PATENT DOCUMENTS

| | | | |
|---|---|---|---|
| 2276209 | 1/1976 | France ................................... 280/293 |
| 697411 | 7/1937 | Germany ............................... 280/293 |
| 2432 | 2/1896 | United Kingdom ................... 280/293 |
| 2037681 | 7/1980 | United Kingdom ................... 280/293 |

*Primary Examiner*—Anne Marie Boehler
*Attorney, Agent, or Firm*—Michael D. Bednarek; Shawpittman

[57] ABSTRACT

This invention is a side wheel attachment for removably attaching an auxiliary side wheel to a bicycle. The side wheel attachment comprises a single structural rod which is folded in the desired shape, i.e. forms a helical torsion spring. In natural unbiased condition, the first and second ends of the spring rod extend generally perpendicularly to one another. The first end of the spring is inversely U-shaped and tangentially engages by its web the rear axle of the bicycle where it can be fixed after adjusting its vertical position relative to the bicycle. The second end of the spring rod is rotatably engaged by the auxiliary side wheel, therefore acting as its axle. Both ends can angularly move relative to one another due to the helical spring. Therefore, in use, both auxiliary side wheels (installed on one side and the other of the rear bicycle wheel) and the rear bicycle wheel loaded by a bicycle rider, always stay in contact with the ground so as to accomplish their respective tasks. The novelty of this invention resides in the structural simplicity of the side wheel attachment which is, as previously stated, constructed from a single structural rod.

14 Claims, 7 Drawing Sheets

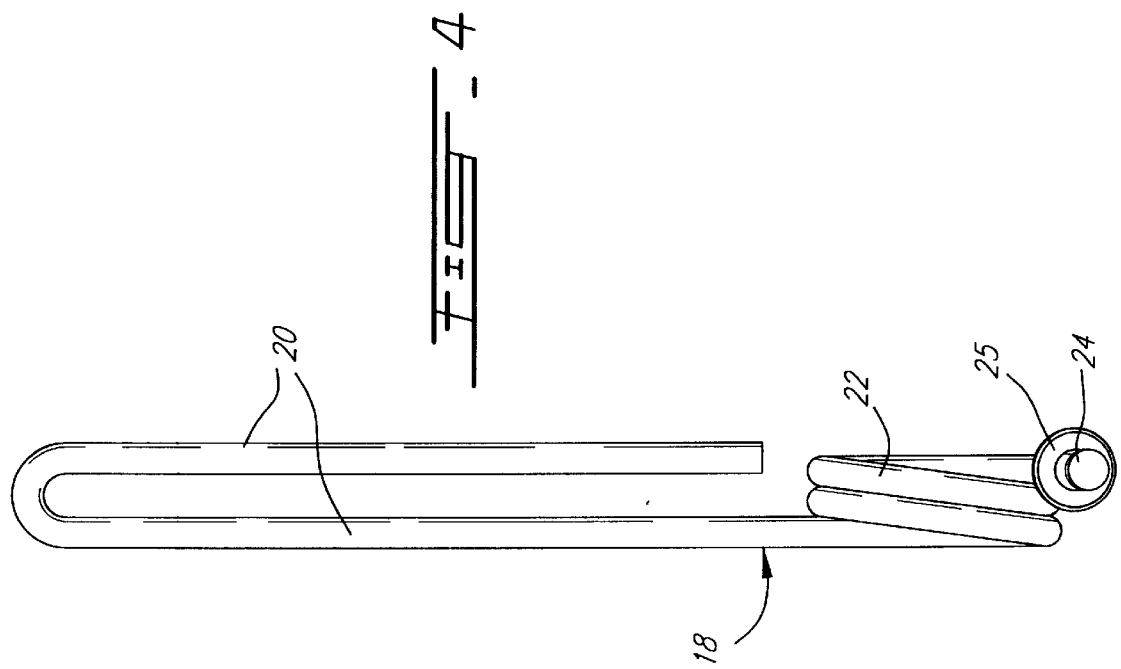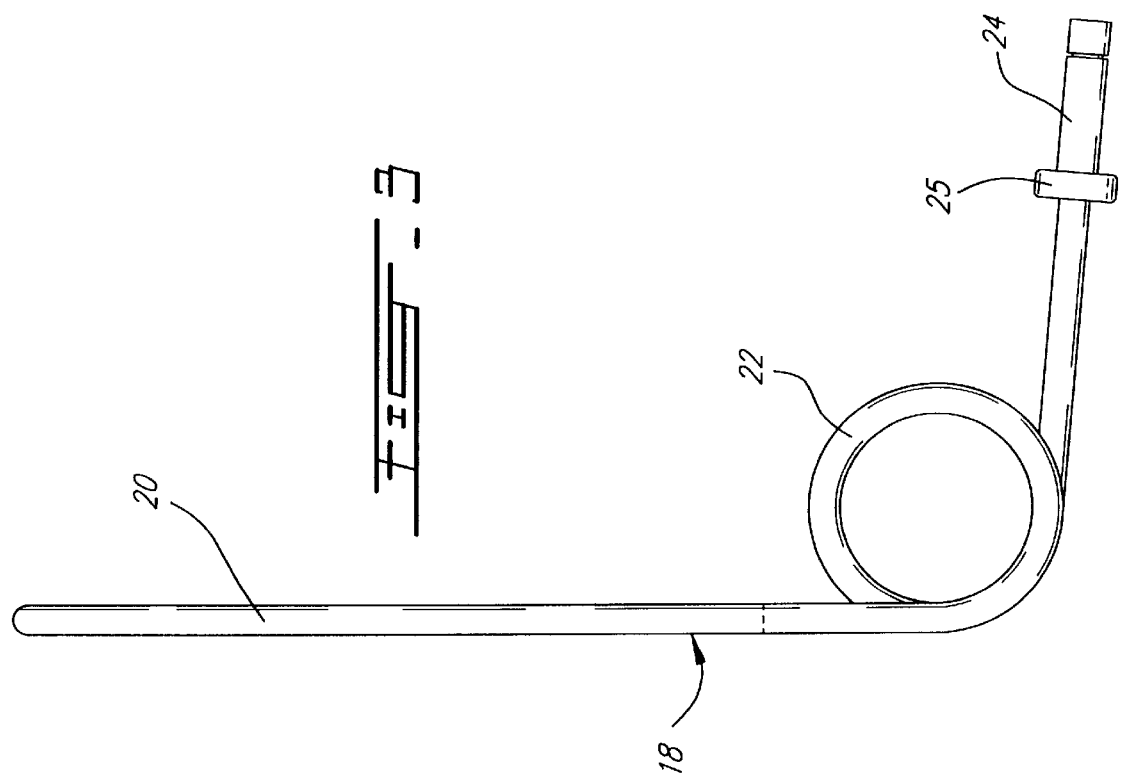

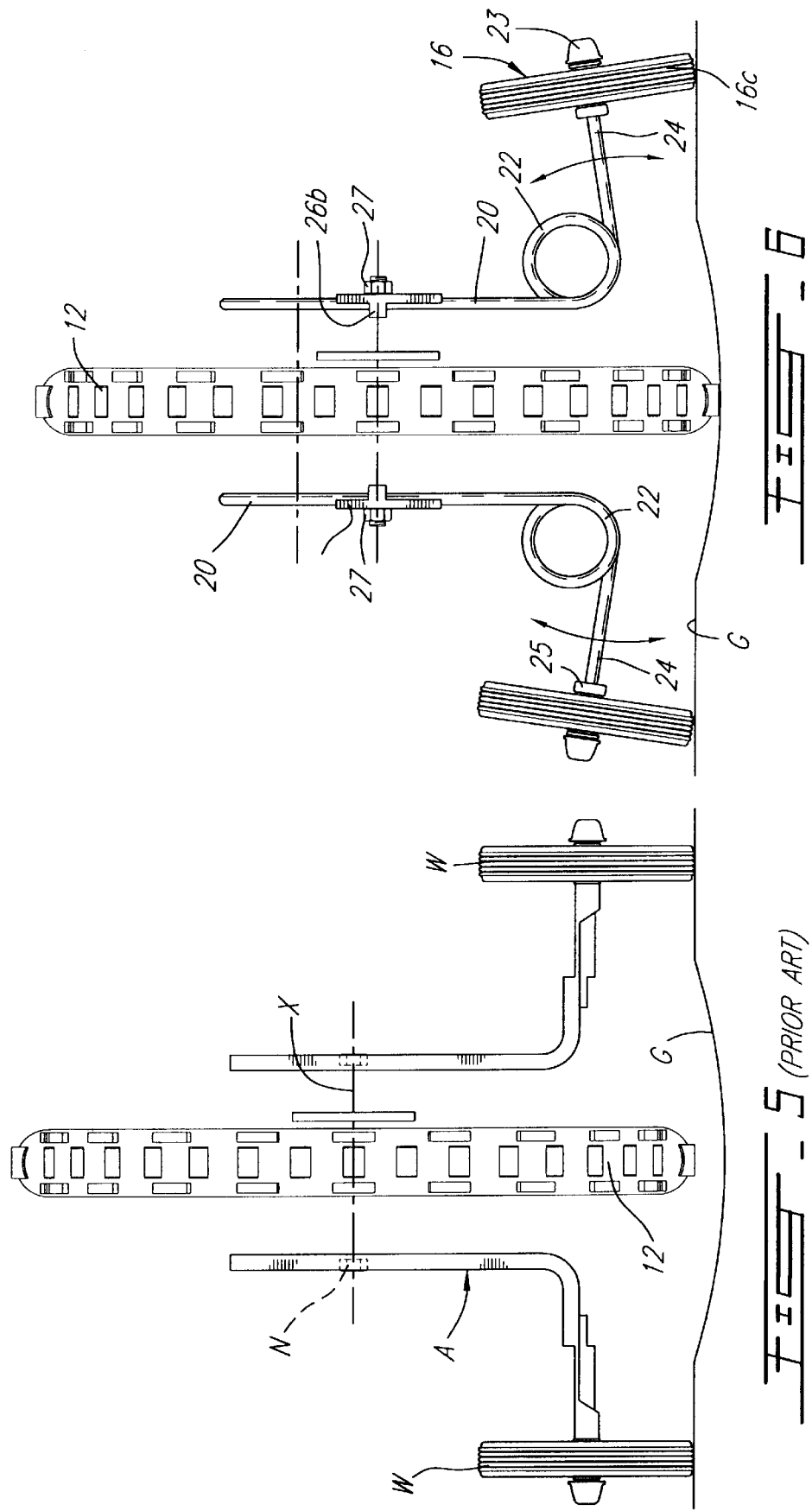

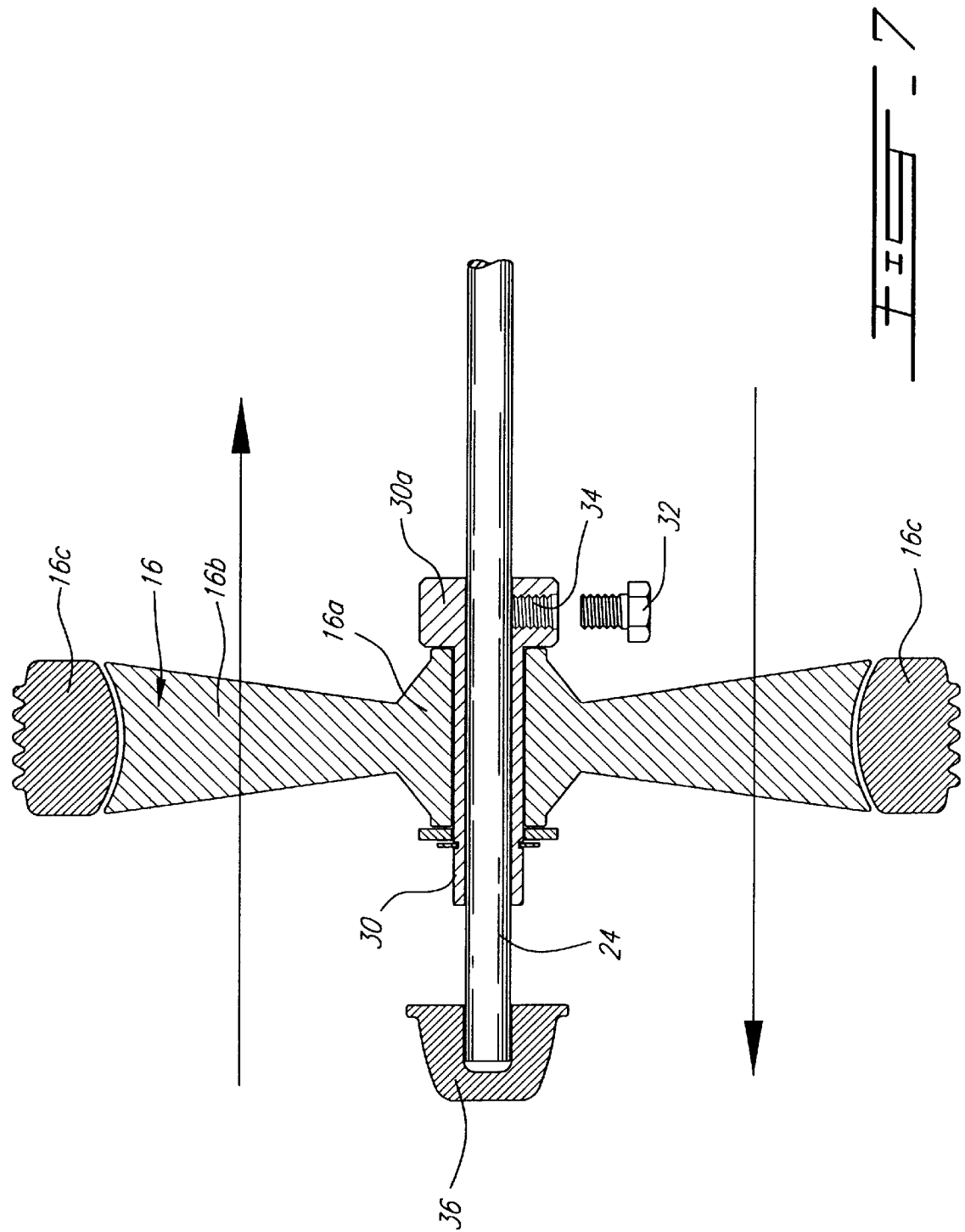

STABILIZER TRAINING WHEEL FOR BICYCLE

This application is a continuation of PCT/IB96/00761 filed Jul. 30, 1996, now in the international phase, which is a continuation-in-part of U.S. patent application Ser. No. 08/427,179 filed Apr. 24, 1995, now abandoned. This application is related to U.S. Pat. No. 5,707,069 issued Jan. 13, 1998.

FIELD OF THE INVENTION

The present invention relates to attachments for a bicycle, and more particularly to a training wheel assembly or an auxiliary side wheel assembly that controls dynamic lateral instability over uneven terrain.

BACKGROUND OF THE INVENTION

It is known in the art to provide a pair of auxiliary side wheels that are to be removably attached to the rear axle of a bicycle to control dynamic lateral instability of the bicycle. Indeed, bicycles are vehicles whose ground stability is dynamically enhanced by increased vehicle speed; at low vehicle speeds, lateral stability is difficult to maintain, particularly for children and other persons unskilled in the art of bicycle handling. These side wheels are most desirable when dealing with children who are learning the rudiments of riding a bicycle and who still have precarious stability when riding their bicycle.

Many auxiliary side wheels that exist have the problem of comprising rigid attachment means for attaching them to a conventional bicycle. Such rigid attachment means are disadvantageous because the unevenness of the ground will often result in one of the side wheels being raised above the ground level exclusively of the laterally opposite other side wheel and therefore not stabilizing the bicycle as it is supposed to; on the other hand, the rear bicycle wheel could be raised above ground level, the rider then temporarily losing propulsion. Furthermore, when the bicycle and its rider enter into a turn, stability of the vehicle will again be compromised, since the bicycle will not be able to incline itself because of the side wheels' rigid attachment.

A few patents have resolved this problem by including suspension means between the bicycle and the auxiliary wheels.

U.S. Pat. No. 5,492,354 issued in 1996 to RAINEY discloses training wheels mounted at the end of a coil spring mounted on each side of the rear bicycle wheel axle. The coil springs have their axes in-line with respect to each other and offset below and parallel to the rear wheel axle. Inasmuch as the coil spring permits upward movement, the training wheels can be pulled backward against the action of the spring. A drawback of the apparatus disclosed by RAINEY is that friction resulting from uneven terrain may cause one wheel to be pulled backwards and thus resist forward movement causing the bicycle to turn. U.S. Pat. No. 2,450,979 issued in 1948 to MOLLER shows a coil spring suspension system for fitting to an auxiliary wheel assembly on a bicycle rear wheel axle. The auxiliary wheel axle is kept downwardly offset from the bicycle gearwheel axle by an L-shaped bracket interconnecting both axles. The hub of the auxiliary wheel is movably interconnected to the bicycle rear axle by an upwardly inwardly inclined, adjustable length coil spring member. Because of the relative angular values between the elongated coil spring member and the two wheel axles, lateral tilt play of the auxiliary wheel axle relative to the bicycle rear axle is limited to a narrow range. The MOLLER device would be expensive to manufacture and prone to become damaged, because of it being made of several separate parts.

U.S. Pat. No. 2,793,877 issued in 1954 to MEIER shows an auxiliary wheel which is mounted near the rear bicycle rear wheel by means of a generally L-shaped flat spring blade. The vertical leg of the L-spring blade and that of a second, rigid L-blade are anchored to the bicycle rear wheel axle. The transverse leg of the rigid blade overlying the transverse wheel axle leg of the flexible blade is movably connected to this flexible blade transverse leg by an adjustable length vertical member. Again, the relative angular play between the auxiliary wheel axle and the bicycle rear wheel axle is quite limited with the MEIER system, notably by the fact that the auxiliary wheel axle motion is limited to a downward motion relative to the horizontal leg of the rigid L-blade (which remains parallel to the bicycle rear wheel axle). The use of a blade spring requires the provision of the second rigid blade and of legs to prevent travel of the blade spring in a horizontal plane either forward or backward.

In both these above noted patents, the auxiliary wheels are functional, but they are complicated in that they necessitate a plurality of parts for installing the side wheels on the bicycle (e.g. brackets or the like, spindles or the like, springs, etc.). It is much more complicated to install the side wheels due to the number of parts involved and it is more probable that a breakage will occur for the same reason. Moreover, the spring adjustment means for the auxiliary wheels provide either upward adjustment or downward adjustment, but not both. Also, neither the MOLLER nor the MEIER reference would seem to enable the bicycle rider to deal effectively with a particular ground surface where the bicycle main rear wheel would engage a groove in the road while both auxiliary wheels would remain at a raised ground level; it would appear that in such a case, the bicycle main rear wheel may lift slightly from the ground, thus compromising ground traction.

SUMMARY OF THE INVENTION

It is an object of this invention to provide an auxiliary wheel assembly for a bicycle which will stabilize the bicycle in a generally vertical position, particularly at low speed.

It is another object of this invention that the auxiliary wheel assembly comprise spring attachment means to allow an almost constant contact of each of the two auxiliary wheels to the ground. It is an important object of this invention to provide attachment means for removably attaching the side wheels on the bicycle, that are simple and can be easily installed on—and removed from—a bicycle.

It is yet another object that the attachment means for removably attaching the side wheels to the bicycle consist of a single structural part.

An important feature of the invention is to provide an auxiliary wheel assembly for a bicycle, which will include spring means enabling both upward and downward angular adjustment of the auxiliary wheels relative to the bicycle main wheel.

Another important feature of the invention is to increase the safety of operations of bicycles fitted with auxiliary side wheels.

In accordance with the objects of the invention, there is provided an auxiliary wheel assembly to be fitted to a rear wheel axle of a bicycle for providing lateral dynamic stability of the bicycle, a pair of such wheel assemblies adapted to be used concurrently on opposite respective lateral sides of the rear wheel axle, each wheel assembly comprising: an auxiliary wheel; a bracket member; anchoring means for releasably anchoring the bracket member transversely to the rear wheel axle; and an attachment member comprising an upper vertical portion connectable to the bracket member, an intermediate helical spring portion and a lower substantially horizontal spindle portion substantially parallel to the rear wheel axle, the auxiliary wheel being mounted to an end of the spindle portion, and the helical spring portion comprising at least about one and a quarter tightly wound turns having a longitudinal axis extending substantially in a forward direction of the bicycle, whereby the auxiliary wheel is free to move substantially vertically while rotating about the longitudinal axis of the helical spring portion.

Preferably, the attachment member is made of a single piece of shaped structural rod. The helical spring portion may be wound in the forward direction, such that the spindle portion is supported by the spring portion against rearward movement. Preferably, the helical spring portion comprises about two and a quarter turns. The spindle portion may naturally extend about 5° downwardly from the horizontal (i.e. an angle of 95° is made between the vertical portion and the spindle portion), in such a way that as weight is applied to the auxiliary wheel the spring portion flexes and the spindle portion moves upwardly towards the horizontal.

Also preferably, wheel adjustment means may be provided for adjusting a position of the auxiliary wheel on the spindle portion to accommodate riders of different weight. The wheel adjustment means may comprise a sleeve member slidingly engaged over the spindle portion, the auxiliary wheel being rotatably mounted over the sleeve member. Height adjustment means may also be provided which cooperate with the bracket member and the anchoring means, for varying a distance between the rear wheel axle and the spindle member, to fit bicycles of varying rear wheel sizes. The upper vertical portion of the attachment member may comprise an inversely U-shape rod member, the anchoring means including a nut member threaded onto an axle bolt of the rear wheel axle, and the bracket member comprising a bracket assembly cooperating with the nut member for fixedly releasably sandwiching the U-shaped rod member. The sleeve member may be slidably mounted along the spindle portion, and locking means may be provided for adjustably locking the auxiliary wheel at a selected position along the spindle portion. The locking means may include a set screw member threadingly engaging through a complementary transverse threaded bore made in the sleeve member.

The invention also provides an auxiliary wheel assembly to be fitted to a rear wheel axle of a bicycle for providing lateral dynamic stability of the bicycle, a pair of such wheel assemblies adapted to be used concurrently on opposite respective lateral sides of the rear wheel axle, each wheel assembly comprising an auxiliary wheel; a rigid outer bracket member; an anchoring rear wheel axle nut for releasably anchoring the bracket member transversely to the rear wheel axle; and an attachment member comprising an upper vertical inverse U-shaped portion made of unitary shaped structural rod and adapted to be sandwiched between the bracket member and a tine of the bicycle holding the rear wheel, with the rear wheel axle positioned inside the U-shaped portion, and a lower substantially horizontal spindle portion substantially parallel to the rear wheel axle, the auxiliary wheel being mounted to an end of the spindle portion, and the upper vertical portion being mountable to the bicycle within a range of positions to provide for an adjustable mounting for accommodating different rear wheel diameters. The anchoring wheel axle nut may also comprise a quick release mechanism.

BRIEF DESCRIPTION OF THE DRAWINGS

The invention will be better understood by way of the following detailed description of a preferred embodiment with reference to the annexed drawings in which:

FIGS. 3 and 4 are front and side elevations, respectively, of the helical spring member of the invention;

FIG. 5 is a view similar to FIG. 1, but schematized, and suggesting how prior art auxiliary wheels with no suspension dealt with uneven terrain, even when the bicycle is loaded;

FIG. 6 is similar to FIG. 5, but suggesting how the present bicycle suspension-provides enhanced bicycle stability; and FIG. 7 is a partial cross-sectional view of a second embodiment of the invention, showing more particularly the adjustable auxiliary side wheel attachment on the spindle.

DETAILED DESCRIPTION OF THE EMBODIMENTS

Figure 1:
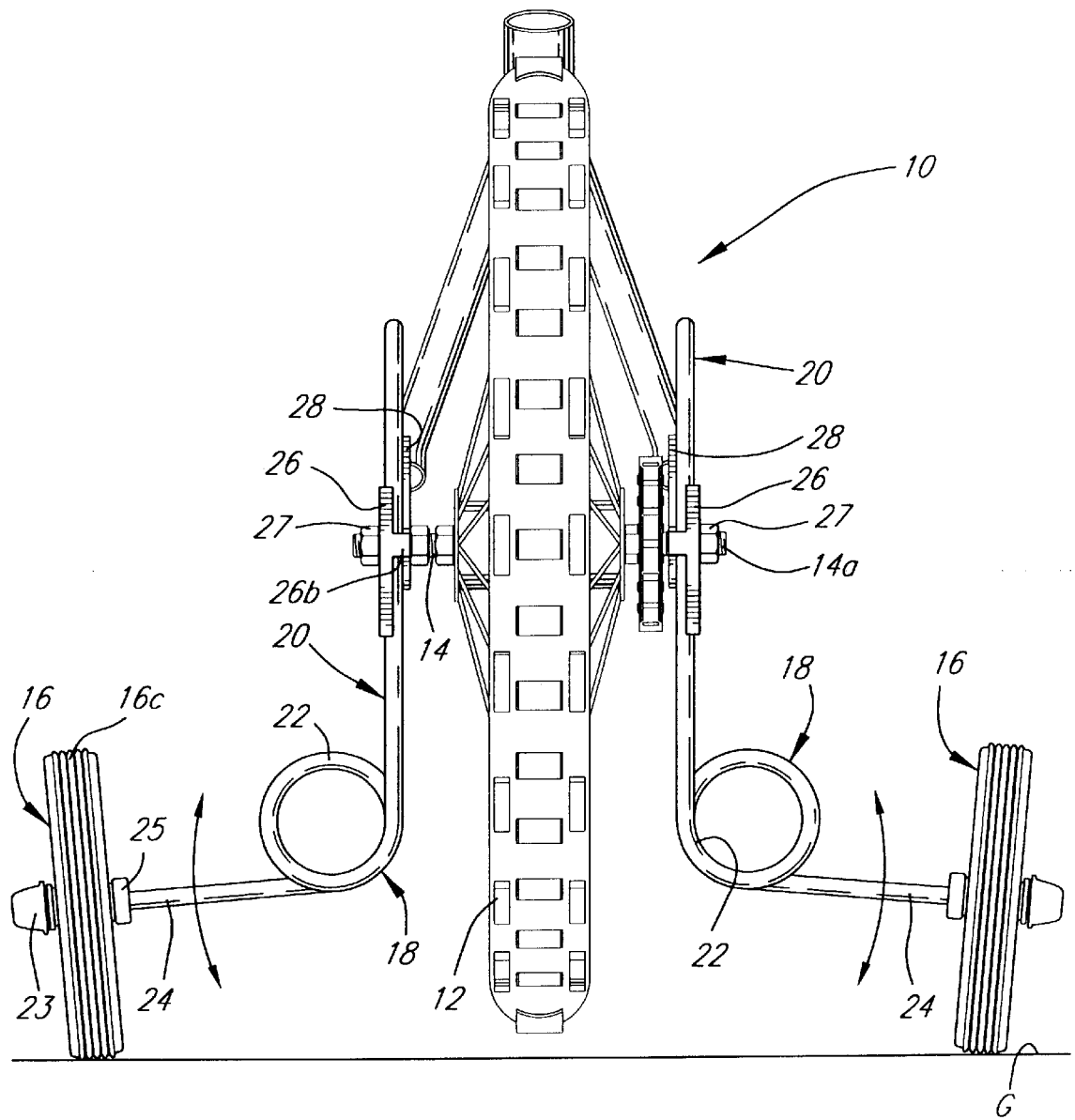
FIG. 1 is a partial end view of a bicycle equipped with a pair of auxiliary wheels and wheel attachment means according to the invention.
Figure 2:
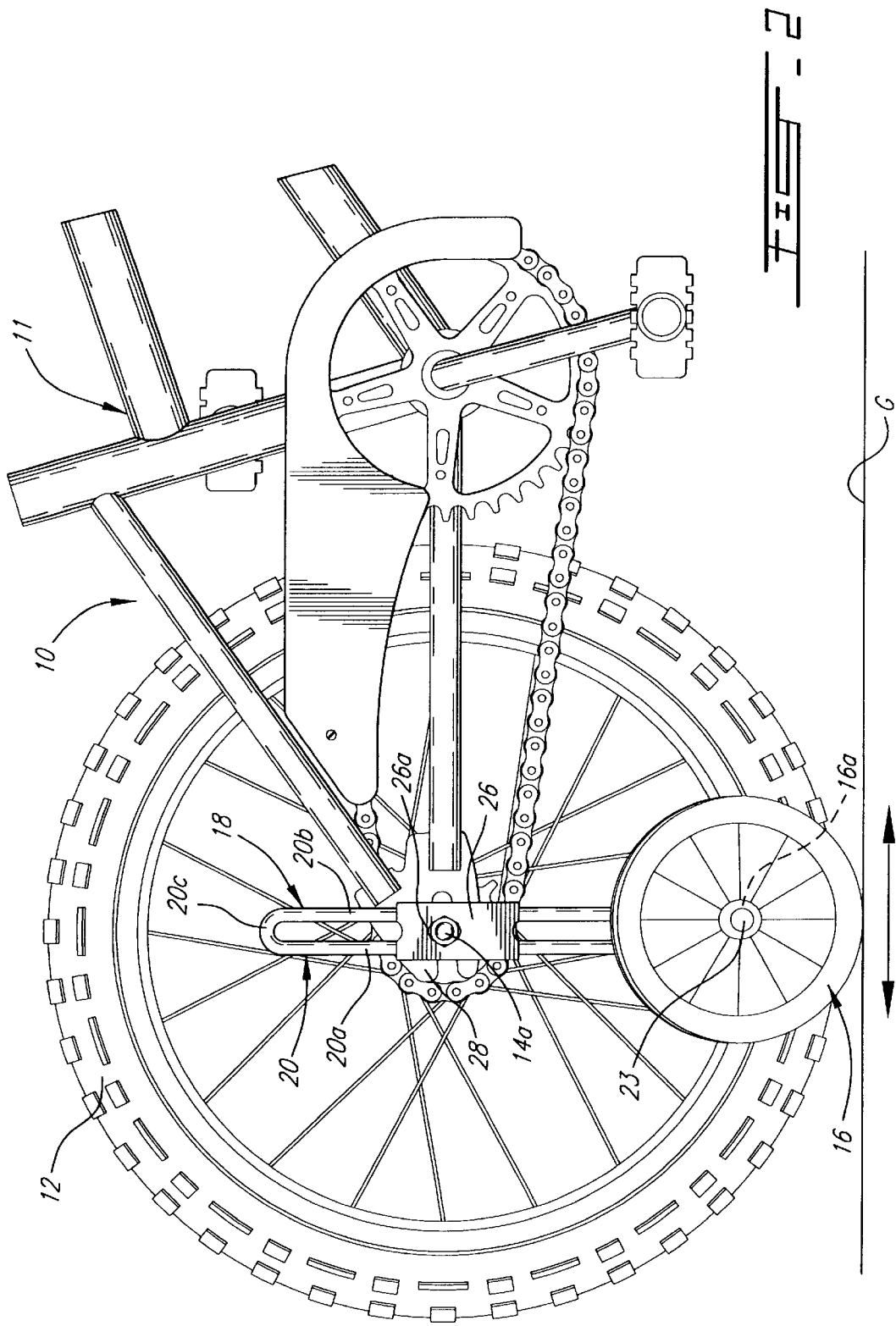
FIG. 2 is a partial side elevation of the rear part of a bicycle, being provided with the auxiliary wheel assembly of the FIG. 1.

FIGS. 1 and 2 show a conventional bicycle 10 comprising a rigid frame 11 carrying a rear wheel 12 over ground G by axle 14.

Bicycle 10 is equipped with a pair of auxiliary side wheels 16, which are smaller in diameter than rear wheel 12. Wheels 16 are to be positioned on each side of rear wheel 12. Wheels 16 are rotatably mounted on corresponding auxiliary side wheel attachment means 18 which are fixedly and removably anchored to opposite ends of axle 14 of bicycle 10. Spring attachment means 18 therefore link auxiliary side wheels 16 to bicycle frame 11.

FIGS. 3 and 4 show that each side wheel attachment means 18 has an upper elongated inversely U-shaped end 20, an intermediate helical spring 22 and a lower auxiliary wheel spindle end portion 24; and the spiraling axis of helix member 22 extends also transversely, relative to each leg 20 and 24 of the spring member 18. As shown in FIG. 4, all elements 20, 22 and 24 are almost coplanar to each other in end view, but form in natural unbiased condition an L-shape in plan view (FIG. 3). Accordingly, helix member 22 constitutes spring means that enable legs 22 and 24 to move toward or away from each other. FIG. 3 shows the wheel attachment member 18 in the released or unbiased condition of the helix part 22, where legs 20 and 24 make approximately a right angle, and preferably 95°, relative to each other. In the released condition of FIG. 3, helix part 22 will yieldingly enable forcible movement of legs 20 and 24 toward one another, or forcible spreading apart displacement of legs 20 and 24, yet will bring legs 20 and 24 to their 95° relative angular condition illustrated in FIG. 3 as soon as the forcible bias on legs 20 and/or 24 has been released. The angle between legs 20 and 24 may range between preferably 85° to 100°. Preferably, the spindle portion 24 is at the front of the coil spring 22 so as to prevent rearward bending of the spindle 24.

Side wheel attachment means 18 is made from a single structural rod folded to the desired shape. Indeed, U-shaped end 20 and auxiliary wheel spindle 24 integrally form the two extremities of helical spring 22. Therefore, side wheel attachment means 18 can be easily constructed and installed as a result of their structural simplicity.

The inversely U-shaped part 20 of spring attachment 18 is brought sideways of bicycle wheel 12, generally parallel thereto, so that the threaded free end portion 14a of the bicycle rear axle 14 engages freely between the two side legs 20a, 20b of U-part 20, through and laterally exteriorly beyond the plane of U-part 20 (see FIG. 1).

Figure 8:
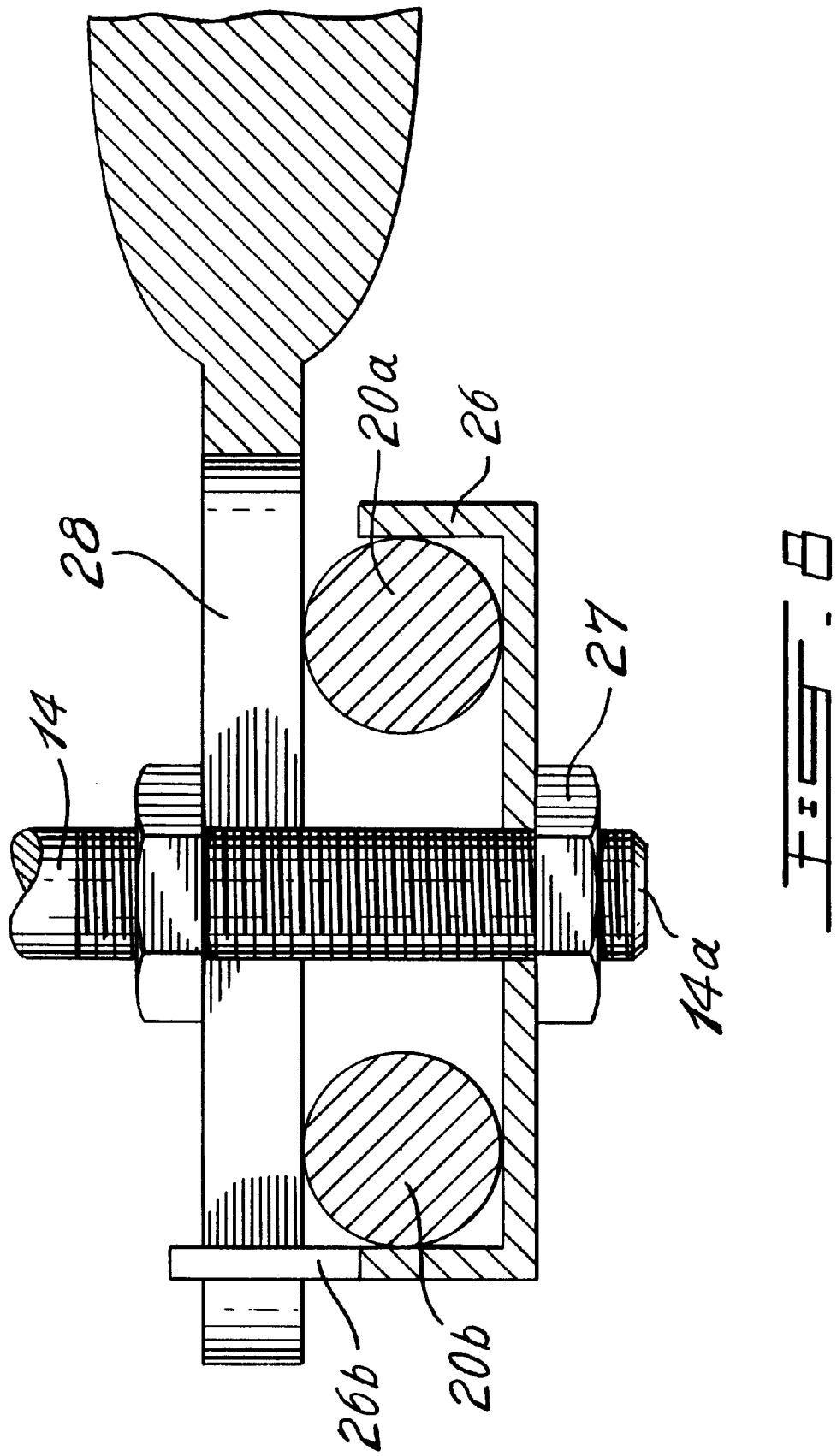
FIG. 8 is a cross-sectional view, from the top of the bicycle, of the bracket surrounding the U-shaped part.

As shown in FIG. 8, a generally flat bracket 26, having an axle bore 26a and a rear tab 26b fitting into the axle bolt receiving slot of frame 28, is applied flatly against the exterior side of part 20, with axle end portion 14a extending through bore 26a. A nut 27 is then screwed on axle end portion 14a, to fixedly anchor U-part 28 transversely to axle 14 and parallel to wheel 12. It is understood that the vertical distance between web 20c of wheel attachment part 20 and securing wheel axle 14 will be adjustable as a function of the diameter of the bicycle rear wheel 12, to fit bicycles of different sizes.

Figure 9:
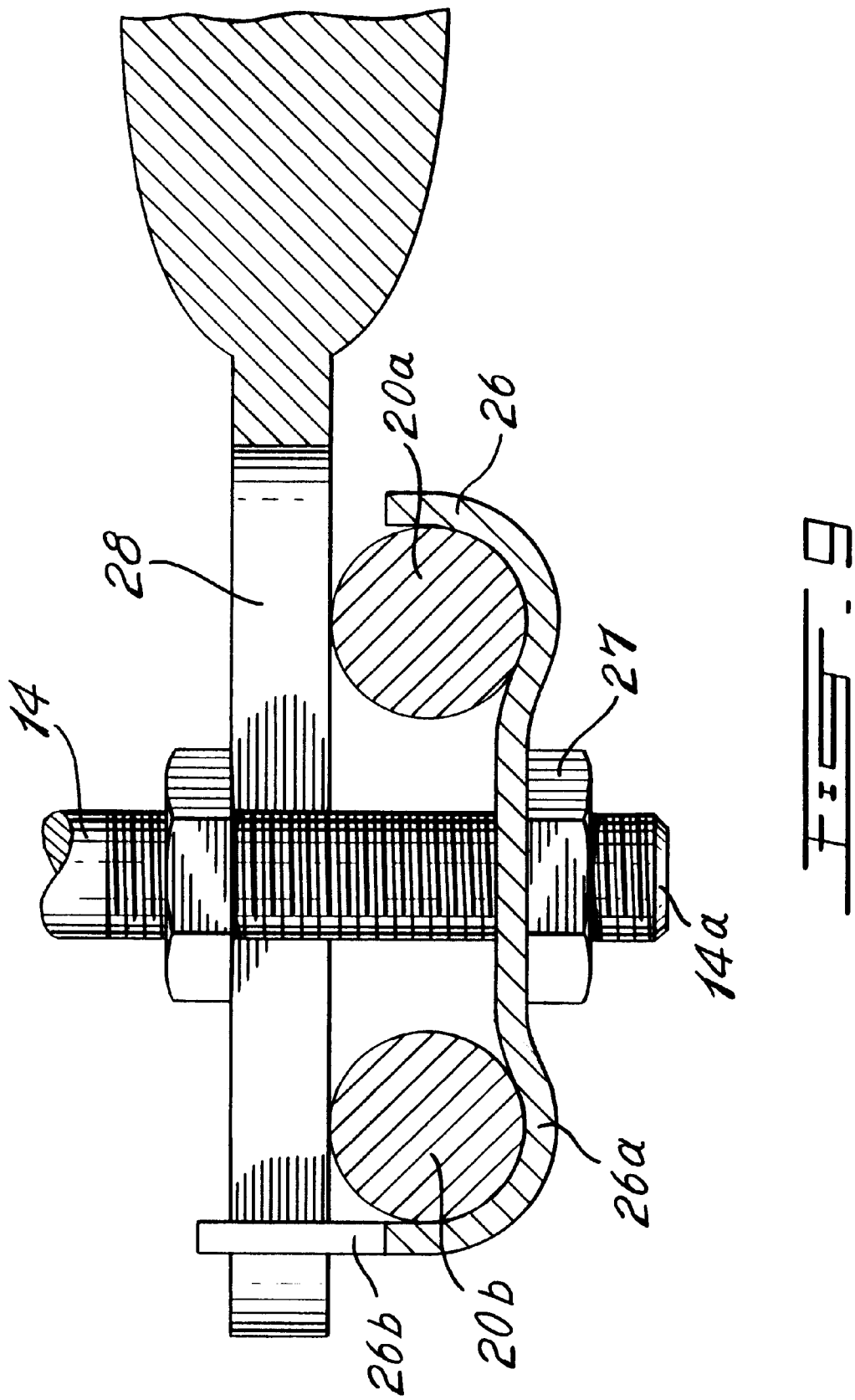
FIG. 9 is a cross-sectional view, from the top of the bicycle, of the bracket surrounding the U-shaped part and comprising inner grooves.

As shown in FIG. 9, bracket 26 preferably has a generally C-shaped cross-section, and includes elongated inner grooves for partial circumferential engagement around the side legs 20a, 20b of U-shaped part 20, so as to properly hold U-shaped part 20 by trapping it between bracket 26 and a parallel frame structure 28 of bicycle main frame 11. Therefore, side wheel attachment means 18 are removably anchored to bicycle 10. Thus, it is possible to adjust the height of side wheel attachment means 18 relative to rear wheel 12 by releasing nut 27 and then sliding side wheel attachment part 20 between bracket 26 and frame structure 28. When the desired relative position is found, nut 27 is installed and tightened once again.

Each side wheel 16 is rotatably freely mounted on its corresponding spindle 24 near its outer end, for a proper lever length. As suggested in FIGS. 1–2, two laterally spaced nuts 23 and 25 are fixedly releasably engaged to spring leg 24, to define a gap therebetween for free rotational engagement by the hub 16a of wheel 16. The intergap between releasably fixed nuts 23 and 25 should be small enough to prevent accidental partial tilt of wheel 16 away from its operative plane orthogonal to spring leg 24. A longer distance between side wheel 16 and helical spring 22 will result in a greater lever for applying torsional tension on spring 22, meaning that it will be easier to force side wheel 16 upwards, since a force applied near the exterior outer end of spindle 24 will result in a greater torque in helical spring 22 than if the force were applied on spindle 24 near helical spring 22. Therefore, it is preferable to position side wheel 16 near the extremity of spindle 24 to obliviate the necessity of having a helical spring 22 with an increased number of whorls or choosing a material with a greater inherent elasticity for the construction of side wheel attachment means 18.

In use, the setting of the height of attachment means 18 relative to rear wheel 12 will preferably raise rear wheel 12 slightly above ground level, as shown in FIG. 1, while there is no rider loading bicycle 10. Therefore, side wheels 16 will be, under most circumstances, in contact with ground G at all times, since the weight of bicycle 10 will cause helical spring 22 to apply a continuous downward pressure on side wheels 16. When a rider mounts bicycle 10, adding its weight to that of bicycle 10, helical springs 22 will yieldingly twist to allow rear wheel 12 to come in contact with ground G. Thus, this torsional tension level in helical springs 22 will bring spring legs 24 and 28 slightly toward one another, from 95° to about 90°, to confer a proper amount of downward pressure on wheels 16 for constant contact of the latter with ground G while rear wheel 12 will also stay in contact with ground G for propulsion of bicycle 10.

If ground level G is uneven, side wheels 16 may move upwards or downwards to compensate for the ground unevenness, while the combined rider weight and helical spring 22 action always keeps all three rear wheels 12, 16, 16 in contact with the ground.

It is clear from inspection of FIGS. 5 and 6 how the present invention improves lateral stability and ground traction of the bicycle, even at low bicycle speeds or in stationary condition, since the bicycle main rear wheel always remains positively engaged with ground, whatever the particulars of ground terrain unevenness. Moreover, because there is no second link member between the auxiliary wheel and the main wheel axle—as in the prior art patents discussed in the previous "background of the invention" paragraph—the circular play of the auxiliary wheel will be considerable. Indeed, nothing would prevent the auxiliary wheel 16 under a heavy terrain gradient, from upwardly pivoting about the helix part 22 of the attachment spring to a location proximate the main wheel axle 14 and almost orthogonal to the plane of main wheel 12. It is this wide level range of adjustment which is so advantageous for the auxiliary wheel 16.

FIG. 7 shows a second embodiment of the invention, wherein the hub 16a of side wheel 16 is rotatably mounted over a sleeve member 30 which is slidably adjustable along the length of side wheel spindle 24 (as suggested by the arrows). Sleeve member 30 can be locked at a particular axial position along spindle 24 by means of a set screw 32, which is inserted in a complementary threaded bore 34 made at an integral enlarged end portion 30a of sleeve 30. A concave cap 36 fits the exterior end of shaft 24 to prevent accidental shearing injuries and to prevent side wheel 16 from sliding off from wheel spindle 24, either during the adjustment of side wheel 16 or during its use, if set screw 32 was not installed tightly enough.

The purpose of this adjustable position of side wheel 16 with set screw 32 is to set a desired lever length between side wheel 16 and helical spring 22. This adjustable lever length is advantageous, for it allows riders of different weights to use bicycle 10 equipped with side wheels 16. Indeed, the weight of a rider must be sufficient, when added to that of the bicycle, to allow rear wheel 12 to stay in contact with ground G and confer effective vehicle wheel traction to rear wheel 12. A lighter rider will necessitate a longer lever length than an heavier one, for a given torsional tension in helical spring 22, to allow rear wheel 12 to come in contact with ground G. It is thus possible to adjust the position of auxiliary side wheels 16 to fit different riders for a maximum efficiency of side wheels 16. It is understood that it would be possible to mark a graduated scale along spindle 24 as a function of the rider's weight so that the desired position of side wheels 16 could be easily found.

Such an auxiliary wheel assembly will increase the safety margin of the bicycle rider, who will therefore feel more confident and should learn faster how to operate and handle the bicycle.

The attachment elements 20, 22, 24, in the preferred embodiment are made from steel rod having a diameter of 0.281" (7 mm) and a Young's modulus of 207 GPa. The steel is preferably OTMB steel and is painted with heat dried paint. The length of the spindle portion is 5" (12.7 cm) from the vertical portion; while the interior diameter of the coils is 1.75" (4.45 cm). These elements could be made of any suitable resilient material, e.g. leaf tempered steel rod, or a resilient sturdy semirigid plastic rod material. The tread band 16c of auxiliary side wheel 16 could be made from plastic or from an elastomeric material, while the auxiliary side wheel hub 16a and associated spokes 16b should be made from a lightweight rigid material, e.g. a sturdy plastic material.

It is noted that, in the prior art, auxiliary wheel attachment of FIG. 5, multiple vertical positional adjustments of the nut N that fixedly secure wheel attachment A to the bicycle rear wheel main axle X, are periodically called upon. The reason for this is that, at given time intervals, e.g. two times per month, it is desirable to raise in increments the height of the auxiliary wheels W, so as to progressively induce in the lay rider the feel of lateral instability of the bicycle at low speeds thereof, while maintaining operating safety margins at comfortable levels.

In the present invention of FIG. 5, on the contrary, continuous adjustments of the height of the auxiliary wheel 16 are automatically performed, responsively to road conditions. Such continuous height adjustments are obviously more advantageous, both for safety reasons and for educational goals.

What is claimed is:

1. In combination with a bicycle, an auxiliary wheel assembly to be fitted to a rear wheel axle and a tine holding said rear wheel of said bicycle for providing lateral dynamic stability of said bicycle, a pair of such wheel assemblies adapted to be used concurrently on opposite respective lateral sides of said rear wheel axle, each said wheel assembly comprising:
   an auxiliary wheel;
   a generally C-shaped rigid outer bracket member including a projection;
   an anchoring rear wheel axle nut for releasably anchoring said bracket member transversely to said rear wheel axle; and
   an attachment member comprising an upper vertical inverse U-shaped portion made of unitary shaped structural rod having a free end and a downwardly extending end and a lower substantially horizontal spindle portion connected to said downwardly extending end substantially parallel to said rear wheel axle, said auxiliary wheel being mounted to an end of said spindle portion, said inverse U-shaped portion being sandwiched between said bracket member and said tine of said bicycle holding said rear wheel, with said rear wheel axle positioned between said free end and said downwardly extending end, with said projection inserted into a slot of said tine, wherein said upper vertical portion is mountable to said bicycle within a range of positions to provide for an adjustable mounting for accommodating different rear wheel diameters.

2. The assembly in combination with said bicycle as claimed in claim 1, further comprising spring means interconnecting said vertical portion and said spindle portion for allowing said auxiliary wheel to move substantially vertically when subjected to force.

3. The assembly in combination with said bicycle as claimed in claim 1, wherein said bracket member includes a central axle through-hole and elongated inner grooves for partial circumferential engagement around each side leg of said U-shaped vertical portion.

4. The assembly in combination with said bicycle as claimed in claim 3, wherein said attachment member further comprises an intermediate helical spring portion between said upper portion and said lower spindle portion, and said helical spring portion comprising at least about one and a quarter tightly wound turns having a longitudinal axis extending substantially in a forward direction of said bicycle, whereby said auxiliary wheel is free to move substantially vertically while rotating about said longitudinal axis of said helical spring portion.

5. The assembly in combination with said bicycle as claimed in claim 2, wherein said attachment member further comprises an intermediate helical spring portion between said upper portion and said lower spindle portion, and said helical spring portion comprising at least about one and a quarter tightly wound turns having a longitudinal axis extending substantially in a forward direction of said bicycle, whereby said auxiliary wheel is free to move substantially vertically while rotating about said longitudinal axis of said helical spring portion.

6. The assembly in combination with said bicycle as claimed in claim 1, wherein said attachment member further comprises an intermediate helical spring portion between said upper portion and said lower spindle portion, and said helical spring portion comprising at least about one and a quarter tightly wound turns having a longitudinal axis extending substantially in a forward direction of said bicycle, whereby said auxiliary wheel is free to move substantially vertically while rotating about said longitudinal axis of said helical spring portion.

7. The assembly in combination with said bicycle as claimed in claim 6, wherein said attachment member is made of a single piece of shaped structural rod.

8. The assembly in combination with said bicycle as claimed in claim 6, wherein said helical spring portion is wound in said forward direction, whereby said spindle is supported by said spring portion against rearward movement.

9. The assembly in combination with said bicycle as claimed in claim 6, wherein said helical spring portion comprises about two and a quarter turns.

10. The assembly in combination with said bicycle as claimed in claim 6, wherein said spindle portion naturally extends about 5° downwardly from the horizontal whereby as weight is applied to said auxiliary wheel said spring portion flexes and said spindle portion moves upwardly towards the horizontal.

11. The assembly in combination with said bicycle as claimed in claim 6, further including wheel adjustment means for adjusting a position of said auxiliary wheel on said spindle portion to accommodate riders of different weight.

12. The assembly in combination with said bicycle as claimed in claim 11, wherein said wheel adjustment means comprise a sleeve member slidingly engaged over said spindle portion, said auxiliary wheel being rotatably mounted over said sleeve member.

13. The assembly in combination with said bicycle as claimed in claim 12, wherein said sleeve member is slidably mounted along said spindle portion, further comprising locking means for adjustably locking said auxiliary wheel at a selected position along said spindle portion.

14. The assembly in combination with said bicycle as claimed in claim 13, wherein said locking means includes a set screw member, threadingly engaging through a complementary transverse threaded bore made in said sleeve member.

* * * * *